(No Model.)
H. N. TIMMS.
CULTIVATOR.
No. 386,507.                          Patented July 24, 1888.
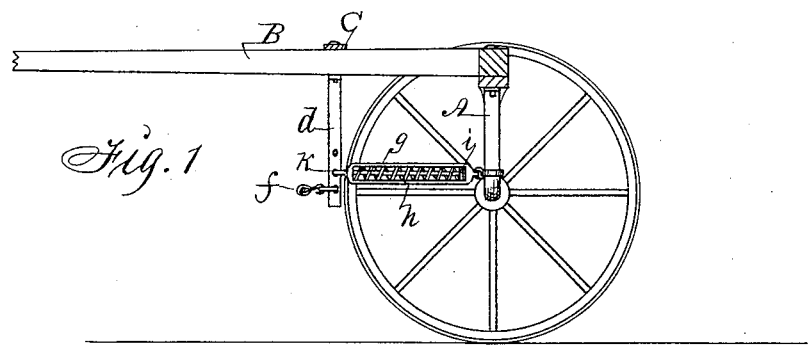
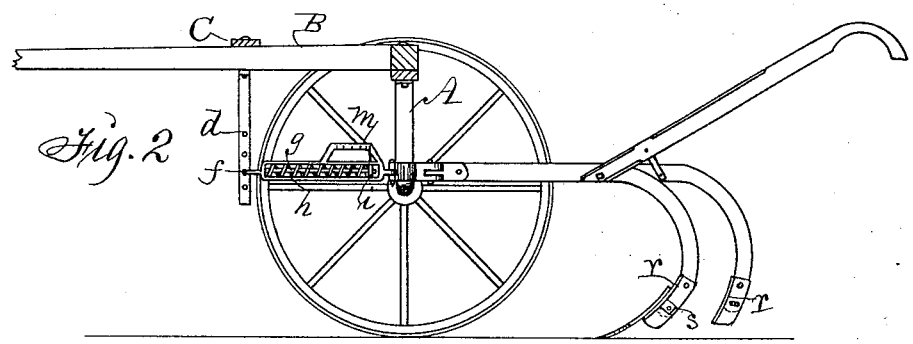
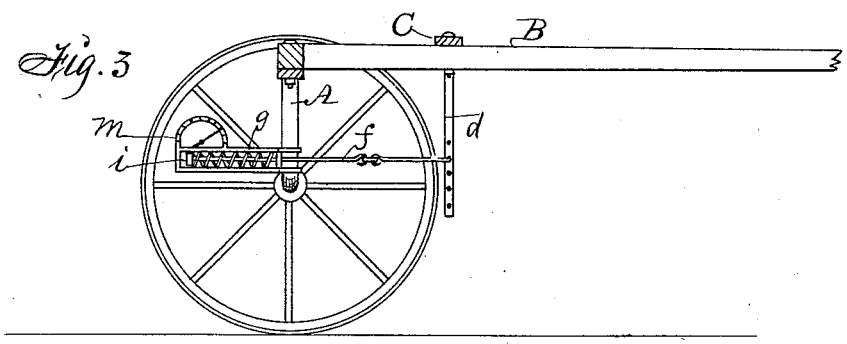
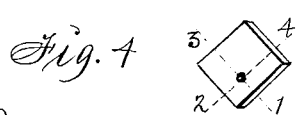   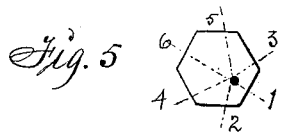
Witnesses:
R. H. Orwig.
M. P. Smith.
Inventor:
Harvey N. Timms,
By Thomas G. Orwig, Atty.
N. PETERS. Photo-Lithographer, Washington, D. C.

UNITED STATES PATENT OFFICE.

HARVEY N. TIMMS, OF DES MOINES, IOWA.

CULTIVATOR.

SPECIFICATION forming part of Letters Patent No. 386,507, dated July 24, 1888.

Application filed November 21, 1887. Serial No. 255,691. (No model.)

*To all whom it may concern:*

Be it known that I, HARVEY N. TIMMS, a citizen of the United States of America, and a resident of Des Moines, in the county of Polk, State of Iowa, have invented new and useful Improvements in Cultivators, of which the following is a specification.

My invention consists in the construction and combination of a buffer device and dynamometer with the evener, pole, and axle of a cultivator-carriage, as hereinafter set forth, pointed out in my claims, and illustrated in the accompanying drawings, in which—

Figure 1 is a side view of a part of a cultivator having a buffer device applied and extending forward from the axle. Fig. 2 is a side view showing a dynamometer combined with the buffer device and the shovel-adjusting device combined with one of the standards. Fig. 3 shows a modified form of the buffer device and dynamometer. Fig. 4 is an enlarged perspective view of a detached part of my shovel-adjusting device. Fig. 5 is a modified form of the shovel-adjusting device.

A represents the arched axle, and B the fixed pole, of a cultivator-carriage.

C is a doubletree or evener pivoted to the pole in a common way. To each end of the evener is attached a swinging singletree-carrier, *d*. It has a series of perforations that allow a singletree, *f*, and also a buffer device, to be adjustably connected therewith, so that they can be readily raised and lowered relative to each other and the pole B.

*g* is a frame that has a hook at its rear end, as shown in Fig. 1, or perforated ears, as shown in Fig. 2, adapting it to be connected with the axle of a carriage in such a manner that it will have lateral and also vertical motion. The front end has a perforation to admit a rod.

*h* is a coil-spring placed between the side bars of the frame *g*.

*i* is a nut placed at the rear end of the spring and between the side bars of the frame in such a manner that it will slide in the frame.

*k* is a rod that has a hook at its front end adapting it to be adjustably connected with the pendent perforated bar *d*. Its rear end is screw-threaded, adapting it to be passed through the front end of the frame and the spring and into the nut, so that the tension of the spring can be regulated by simply turning the rod, and the spring and rod kept in proper position within the frame.

*m* represents a scale formed on or fixed to the frame *g*.

*n* is a pointer formed on or connected with the sliding nut *i* in such a manner that when power is applied to the singletree such draft force will be indicated by the position of the pointer relative to the figures on the scale.

In Fig. 3 the frame *g* extends rearward from the axle and the scale is in the form of a segment of a circle and the pointer pivoted to the frame and flexibly connected with the sliding nut.

I am aware that eveners pivoted to the poles have been connected with the carriages of cultivators by means of pendent bars and chains, and that buffer-springs and dynamometers have been applied for analogous uses; but my combination of a buffer-spring with a cultivator-carriage and an evener pivoted to the pole of the carriage, and my construction of a frame adapted to be used as a part of a dynamometer and also as a part of a buffer device, is novel and greatly advantageous in that the buffers will coact with the eveners in preventing concussion, and the dynamometer will be a permanent fixture and cost less than dynamometers made separately and attached to a cultivator.

In Patent No. 371,995, issued to me October 25, 1887, a buffer device is shown in Fig. 5, connected with the axle and a singletree attached to the under side of an evener pivoted to a pole; but my combination of a buffer device with a cultivator-carriage and a swinging hanger suspended from an evener pivoted to a pole in such a manner that the buffer device can be vertically adjusted relative to the pole and the height of the horses, as required, to be in the direct line of draft, is novel and greatly advantageous.

I claim as my invention—

1. The combination, with a cultivator-frame, of an evener, swinging hangers attached to the evener, frames having hooks for attachment to the axle or drag-bars, and buffer-springs working in said frames and adjustably attached to the swinging hangers, substantially as described.

2. The combination, with a cultivator-frame, of an evener, swinging hangers, and buffer-springs attached to the hangers and the drag-bars, frames for said springs, and a dynamometer or draft-registering device attached to the springs and frames, substantially as described.

HARVEY N. TIMMS.

Witnesses:
MARTIN P. SMITH,
THOMAS G. ORWIG.